(12) United States Patent
Wang et al.

(10) Patent No.: US 11,469,418 B2
(45) Date of Patent: Oct. 11, 2022

(54) NEGATIVE ELECTRODE SHEET AND BATTERY

(71) Applicant: Contemporary Amperex Technology Co., Limited, Fujian (CN)

(72) Inventors: Jiazheng Wang, Ningde (CN); Meng Kang, Ningde (CN); Yuliang Shen, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/973,536

(22) PCT Filed: Oct. 15, 2019

(86) PCT No.: PCT/CN2019/111331
§ 371 (c)(1),
(2) Date: Dec. 9, 2020

(87) PCT Pub. No.: WO2020/078358
PCT Pub. Date: Apr. 23, 2020

(65) Prior Publication Data
US 2021/0249656 A1    Aug. 12, 2021

(30) Foreign Application Priority Data
Oct. 17, 2018    (CN) .......................... 201811208744.7

(51) Int. Cl.
H01M 4/583    (2010.01)
H01M 4/38    (2006.01)
H01M 4/02    (2006.01)

(52) U.S. Cl.
CPC ........... *H01M 4/583* (2013.01); *H01M 4/386* (2013.01); *H01M 4/387* (2013.01); *H01M 2004/027* (2013.01)

(58) Field of Classification Search
None
See application file for complete search history.

(56) References Cited

U.S. PATENT DOCUMENTS

| | | |
|---|---|---|
| 2012/0315538 A1 | 12/2012 | Chiang et al. |
| 2016/0164073 A1 | 6/2016 | Liu et al. |

FOREIGN PATENT DOCUMENTS

| | | | |
|---|---|---|---|
| CN | 1688063 A | | 10/2005 |
| CN | 101174683 A | | 5/2008 |
| CN | 102610791 A | | 7/2012 |
| CN | 105934845 A | | 9/2016 |
| CN | 108461842 A | † | 8/2018 |
| CN | 109449373 A | | 3/2019 |
| CN | 109449373 B | † | 3/2019 |
| EP | 3 232 497 A1 | | 10/2017 |
| EP | 3232497 A1 | † | 10/2017 |
| JP | 2008-311209 | * | 12/2008 |
| JP | 5460948 B2 | | 4/2014 |
| KR | 20140008957 A | | 1/2014 |
| WO | 2005076936 A2 | † | 8/2005 |

OTHER PUBLICATIONS

Search Report and Written Opinion dated Jan. 7, 2020 in corresponding International Application No. PCT/CN2019/111331; 14 pages.
Office Action dated Mar. 10, 2020 in corresponding Chinese Application No. 201811208744.7; 9 pages.
Extended European Search Report dated Jul. 19, 2021, in connection with corresponding EP Application No. 19872955.0; 7 pages.
Hao Ge et al., "Study on the Theoretical Capacity of Spinel Lithium Titanate Induced by Low-Potential Intercalation," The Journal of Physical Chemistry Letters C, pp. 6324-6326, American Chemical Society, Mar. 31, 2019.†
Krzysztof Kierzek,"Influence of Binder Adhesion Ability on the Performance of Silicon/Carbon Composite as Li-Ion Battery Anode," Journal of Materials Engineering and Performance, 2326-2330, Springerlink.com, Apr. 28, 2016.†
First Office Action for Application CN201811208744.7, State Intellectual Property Office of China, dated Mar. 10, 2020, machine translation obtained via Global Dossier on Jan. 13, 2021.†

\* cited by examiner
† cited by third party

*Primary Examiner* — Laura Weiner
(74) *Attorney, Agent, or Firm* — Maier & Maier, PLLC

(57) ABSTRACT

The present application provides a negative electrode sheet and a battery. The negative electrode sheet includes a negative current collector and a negative electrode film provided on at least one surface of the negative current collector and including a negative active material, and the negative electrode film satisfies: $4 \leq P \times [(30-Dv50)/2+2 \times (10-M)] \leq 20$. P represents a porosity of the negative electrode film; Dv50 represents a volume median particle diameter of the negative active material, and a unit is µm; M represents a capacity per unit area of a negative electrode film, and a unit is mAh/cm$^2$. The negative electrode sheet of the present application has the characteristics of excellent dynamics performance, and the battery of the present application also has the characteristics of excellent dynamics performance, long cycle life and high energy density at the same time.

8 Claims, No Drawings

NEGATIVE ELECTRODE SHEET AND BATTERY

CROSS-REFERENCE TO RELATED APPLICATIONS

This application is a National Stage of International Application No. PCT/CN2019/111331, filed on Oct. 15, 2019, which claims priority to Chinese Patent Application No. 201811208744.7, filed on Oct. 17, 2018, both of which are incorporated herein by reference in their entireties.

TECHNICAL FIELD

The application relates to the field of batteries, and in particular, to a negative electrode sheet and a battery.

BACKGROUND

Rechargeable batteries are widely used in the mobile phones, computers, household electric appliances, electric power tools and other fields due to outstanding characteristics of light weight, high energy density, no pollution, no memory effect, and long service life and the like. The charging time has got more and more attention from end consumers and is also an important factor limiting the popularization of the rechargeable batteries.

From the viewpoint of technical principle, the core of battery fast charging technology is to increase the speed of ion movement between positive and negative electrode through chemical system harmonization and design optimization. If the negative electrode cannot withstand high current charging, the ions will be directly reduced and precipitated on the surface of the negative electrode instead of being intercalated in the negative active material during battery fast charging. At the same time, a large number of by-products may be produced on the surface of the negative electrode during the battery fast charging, which will affect the cycle life and safety of the battery. Therefore, the key to the battery fast charging technology lies in the design of the negative active material and the negative electrode sheet.

SUMMARY

In view of the problems existing in the background, an object of the present application is to provide a negative electrode sheet and a battery, the negative electrode sheet have excellent dynamics performance, the battery has the characteristics of excellent dynamics performance, long cycle life and high energy density at the same time.

In order to achieve the above object, in the first aspect of the present application, the present application provides a negative electrode sheet, which comprises a negative current collector and a negative electrode film provided on at least one surface of the negative current collector and comprising a negative active material, and the negative electrode film satisfies: $4 \leq P+[(30-Dv50)/2+2\times(10-M)] \leq 20$. Where, P represents a porosity of the negative electrode film; Dv50 represents a volume median particle diameter of the negative active material, and a unit is µm; M represents a capacity per unit area of a negative electrode film, and a unit is mAh/cm$^2$.

In the second aspect of the present application, the present application provides a battery, which comprises the negative electrode sheet according to the first aspect of the present application.

Compared with the prior art, the present application at least includes the following beneficial effects: by adjusting the relationship between the porosity P of the negative electrode film, the capacity M per unit area of the negative electrode film and the volume median particle diameter Dv50 of the negative active material, and a battery with excellent dynamics performance, long cycle life and high energy density at the same time is obtained in the present application.

DETAILED DESCRIPTION OF EMBODIMENTS

Hereinafter a negative electrode sheet and a battery according to the present application are described in detail.

Firstly, a negative electrode sheet according to the first aspect of the present application is described. The negative electrode sheet comprises a negative current collector and a negative electrode film provided on at least one surface of the negative current collector and comprising a negative active material, and the negative electrode film satisfies: $4 \leq P\times[(30-Dv50)/2+2\times(10-M)] \leq 20$. Where, P represents a porosity of the negative electrode film; Dv50 represents a volume median particle diameter of the negative active material, and a unit is µm; M represents a capacity per unit area of the negative electrode film, and a unit is mAh/cm$^2$. It should be noted that the capacity M per unit area of the negative electrode film refers to the capacity per unit area of the negative electrode film located on any one of the surfaces of the negative current collector.

In some embodiments of the present application, the lower limit of $P\times[(30-Dv50)/2+2\times(10-M)]$ may be 4, 4.5, 5, 5.5, 6, 6.5, 7, 7.5, 8, 8.5, 9, and the upper limit of $P\times[(30-Dv50)/2+2\times(10-M)]$ may be 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20. Optionally, $6 \leq P\times[(30-Dv50)/2+2\times(10-M)] \leq 15$; optionally, $8 \leq P\times[(30-Dv50)/2+2\times(10-M)] \leq 12$.

The negative electrode sheet needs to undergo the following three electrochemical processes during the charging process of the battery: (1) the ions (such as lithium ions, sodium ions and the like) de-intercalated from the positive active material enter into the electrolyte, and then enter into pore channels of the negative porous electrode along with the electrolyte, so that a liquid phase conduction process of the ions is conducted inside the pore channels of the negative porous electrode; (2) the ions pass through the SEI film on the surface of the negative active material and exchange charges with the electrons on the surface of the negative active material; (3) the ions enter into the bulk phase of the negative active material and perform the solid phase diffusion and accumulation. The smaller the resistance of the above three electrochemical processes, the more conducive to improving the fast charging capability of the battery, and the better the dynamics performance of the battery; conversely, the greater the resistance of the above three electrochemical processes, the less conducive to improving the fast charging capability of the battery, the worse the dynamics performance of the battery.

Generally, the smaller the porosity P of the negative electrode film, the greater the liquid phase diffusion resistance of ions inside the pore channels of the negative porous electrode, which is not conducive to improving the fast charging capability of the battery, and the dynamics performance of the battery is also worse; on the contrary, the greater the porosity P of the negative electrode film, the smaller the liquid phase diffusion resistance of ions inside the pore channels of the negative porous electrode, in principle, the more beneficial it is to improve the fast charging capability of the battery, and the better the dynamics performance of the battery. However, when the porosity P of the negative electrode film becomes larger, the degree of accumulation between the negative active material particles in the negative electrode film becomes looser, the electronic contact between the particles and the particles becomes worse, the electronic conductivity deteriorates, and the charge exchange resistance between ions and electrons on the surface of the negative active material tends to increase, thereby affecting the improvement on the dynamics performance of the battery. At the same time, when the porosity P of the negative electrode film becomes larger, the advantage of the high volume energy density of the negative electrode is gradually lost, which also affects the energy density of the battery.

Generally, the smaller the volume median particle diameter Dv50 of the negative active material, the smaller the charge exchange resistance of ions and electrons on the surface of the negative active material is during charging of the battery, and the smaller the solid phase diffusion and accumulation resistance of ions in the bulk phase of the negative active material, but at the same time, the higher the probability of the pore channels of the negative porous electrode being blocked by the negative active material with a small particle size, the liquid phase conduction path of the ions in the pore channels of the negative porous electrode is extended and the liquid phase diffusion resistance increases, which affects the improvement of dynamics performance of the battery. In addition, the smaller the volume median particle diameter Dv50 of the negative active material, the advantage of negative high volume energy density is gradually lost, which also affects the energy density of batteries.

Generally, the smaller the capacity M per unit area of the negative electrode film, the faster the accumulation rate of ions in the bulk phase of the negative active material, and the more conducive to improving the fast charging capability of the battery, the better the dynamics performance of the battery, but at the same time, the smaller the capacity M per unit area of the negative electrode film, the greater the negative impact on the energy density and cycle life of the battery.

Therefore, the different parameters of the negative active material and the negative electrode sheet have different effects on the cycle life, energy density and dynamics performance of the battery. Relying on the optimization of the above parameters by themselves has great limitations in realizing excellent dynamics performance, long cycle life and higher energy density of the battery.

The inventor has found through extensive research that when the porosity P (dimensionless) of the negative electrode film, the volume median particle diameter Dv50 (the unit is μm) of the negative active material, the capacity M (the unit is mAh/cm$^2$) per unit area of the negative electrode film satisfy $4 \leq P \times [(30-Dv50)/2+2 \times (10-M)] \leq 20$, the liquid phase conduction resistance of ions inside the pore channels of the negative porous electrode, the charge exchange resistance of ions and electrons on the surface of the negative active material, and the solid phase diffusion and accumulation resistance of ions in the bulk phase of the negative active material are kept to a low level, so that the negative electrode sheet may have excellent dynamics performance and high volume energy density, thus enabling the battery has excellent dynamics performance and volume energy density, and has the advantages of long cycle life and high energy density at the same time.

In the negative electrode sheet of the first aspect of the present application, optionally, the porosity P of the negative electrode film is 20%-65%; optionally, the porosity P of the negative electrode film is 22%-60%; optionally, the porosity P of the negative electrode film is 22%-55%. When the porosity of the negative electrode film falls within the above preferred ranges, the liquid phase diffusion resistance of ions inside the pore channels of the negative porous electrode and the charge exchange resistance between ions and electrons on the surface of the negative active material are small, so that the negative electrode sheet can have more excellent dynamics performance; at the same time, the electrolyte retaining capability of the negative electrode film is better, which can ensure good electrolyte infiltration between the particles of the negative active material particles, and the interfacial charge transfer resistance between the negative active material and the electrolyte is also lower, resulting in that the dynamics performance and the cycle life of the battery can be further improved.

In the negative electrode sheet of the first aspect of the present application, optionally, the volume median particle diameter Dv50 of the negative active material is 4 μm-20 μm; further optionally, the volume median particle diameter Dv50 of the negative active material is 4 μm~18 μm; more optionally, the volume median particle diameter Dv50 of the negative active material is 4 μm~16 μm. When the volume median particle diameter of the negative active material falls within the above preferred ranges, the homogeneity of the negative electrode sheet can be higher, thus avoiding that too small a particle diameter of the negative active material causes more side reactions with the electrolyte, thereby affecting the improvement effect of the performance of the battery, and too large a particle diameter prevents the solid phase diffusion and accumulation of the ions in the bulk phase of the negative active material, thereby affecting the improvement on the battery performance.

In the negative electrode sheet of the first aspect of the present application, optionally, the capacity M per unit area of the negative electrode film is controlled within 0.5 mAh/cm$^2$~7.0 mAh/cm$^2$; further optionally, the capacity M per unit area of the negative electrode film is controlled within 1.0 mAh/cm$^2$~6.0 mAh/cm$^2$; more optionally, the capacity M per unit area of the negative electrode film is controlled within 1.0mAh/cm$^2$~5.5mAh/cm$^2$. When the capacity per unit area of the negative electrode film falls within the above preferred ranges, the negative electrode sheet can maintain excellent dynamics performance while also having the advantage of high volume energy density, furthermore the battery can better improve the dynamics performance while maintaining a higher energy density advantage.

The gram capacity (the unit is mAh/g) of the negative active material, the coating weight (the unit is g/cm$^2$) per unit area of the negative electrode sheet, and the proportion of the negative active material in the negative electrode film all affect the capacity M (the unit is mAh/cm$^2$) per unit area of the negative electrode film. Generally, under the same other preparation conditions, the higher the gram capacity of the negative active material, the higher the coating weight per unit area of the negative electrode sheet, and the higher the proportion of the negative active material in the negative electrode film, the larger the capacity M per unit area of the negative electrode film, the weaker the fast charging capability of the battery and the worse the dynamics performance of the battery. This is because the higher the gram capacity of the negative active material, under the same conditions, the greater the solid diffusion and accumulation resistance of ions in the bulk phase of the negative active material; the higher the coating weight per unit area of the negative electrode sheet, the higher the proportion of the negative active material in the negative electrode film, the greater the thickness of the negative electrode film, the longer the liquid phase diffusion path of ions inside the pore channels of the negative porous electrode, and the greater the liquid phase diffusion resistance of the ion, which is more unconducive to the improvement of the dynamics performance of the battery.

In the negative electrode sheet of the first aspect of the present application, optionally, the negative active material can be one or more selected from carbon materials, silicon-based material, tin-based material and lithium titanate. The carbon material can be one or more selected from graphite, soft carbon, hard carbon, carbon fiber and mesocarbon microspheres; the graphite can be one or more selected from artificial graphite and natural graphite; the silicon-based material can be one or more selected from elemental silicon, silicon-oxygen compound, silicon-carbon composite and silicon alloy; the tin-based material can be one or more selected from elemental tin, tin oxide compound and tin alloy. More optionally, the negative active material is one or more selected from carbon materials and silicon-based materials.

In the negative electrode sheet of the first aspect of the present application, optionally, the coating weight per unit area of the negative electrode sheet is 1 mg/cm$^2$~22 mg/cm$^2$; optionally, the coating weight per unit area of the negative electrode sheet is 2 mg/cm$^2$~18 mg/cm$^2$; optionally, the coating weight per unit area of the negative electrode sheet is 4 mg/cm$^2$~12 mg/cm$^2$. When the coating weight per unit area of the negative electrode sheet falls within the above preferred range, the negative electrode sheet can maintain excellent dynamics performance while having high volume energy density advantage, and the dynamic performance of the battery can be better improved while maintaining higher energy density of the battery advantage.

In the negative electrode sheet of the first aspect of the present application, under the same other conditions, the smaller the compaction density PD of the negative electrode film, the more developed the structure of the pore channels of the negative porous electrode, the more conducive to the liquid phase diffusion of ions inside the pore channels of negative porous electrode, especially under severe conditions where the battery undergoes multiple charge and discharge and repeated expansion and contraction, the liquid phase diffusion resistance of ions inside the pore channels of negative porous electrode can be still ensured to keep to a low level. However, when the compaction density of the negative electrode film is too small, it may cause the negative electrode sheet to peel off the film and powder, the ions will be reduced and precipitated directly on the negative electrode surface due to poor electronic conductivity during charging, thereby affecting the dynamics performance and cycle life of the battery and reducing the energy density of the battery. Optionally, the compaction density PD of the negative electrode film is 0.8 g/cm$^3$~2.0 g/cm$^3$; optionally, the compaction density PD of the negative electrode film is 1.0 g/cm$^3$~1.6 g/cm$^3$. When the compaction density of the negative electrode film falls within the above preferred range, the dynamics performance of the battery can be better improved while maintaining higher energy density of the battery advantage.

In the negative electrode sheet of the first aspect of the present application, in addition to the porosity P of the negative electrode film, the capacity M per unit area of the negative electrode film, and the volume median particle diameter Dv50 of the negative active material greatly affect the dynamics performance of the battery, the adhesive force F between the negative electrode film and the negative current collector may also affect the dynamics performance of the battery. The greater the adhesive force F between the negative electrode film and the negative current collector, the better the conductivity of electrons passing through the negative current collector to the negative electrode film, the smaller the charge exchange resistance between ions and electrons on the surface of the negative active material, and the more excellent the battery dynamics performance; however, an excessive adhesive force F between the negative electrode film and the negative current collector may reduce the energy density of the battery. Through extensive research, the inventors found that when the adhesive force F (the unit is N/m) between the negative electrode film and the negative current collector and the capacity M (the unit is mAh/cm$^2$) per unit area of the negative electrode film satisfy $M/3 \leq F \leq 6M$, the dynamics performance and cycle performance of the battery can be better improved, while ensuring the battery having higher energy density advantage. Optionally, the adhesive force between the negative electrode film and the negative current collector satisfies $M/2 \leq F \leq 5M$.

It should be noted that under the condition that the coating weight per unit area of the negative electrode sheet is constant, the adhesive force between the negative electrode film and the negative current collector is related to the content of the binder in the negative electrode film, the type of the binder, the compaction density of the negative electrode film and the like, and a person skilled in the art can choose a method known in the art based on actual demands to adjust the adhesive force between the negative electrode film and the negative current collector.

In the negative electrode sheet of the first aspect of the present application, the negative electrode film can be provided on one surface of the negative current collector or on both surfaces of the negative current collector. The negative electrode film may further include a conductive agent and a binder, where the type and content of the conductive agent and the binder are not specifically limited, and can be selected based on actual demands. The type of the negative current collector is also not specifically limited, and can be selected based on actual demands, optionally copper foil can be used.

It should be noted that when the negative electrode film is provided on both surfaces of the negative current collector, as long as the negative electrode film on either of the surfaces satisfies the present application, it is considered that the negative plate falls within the protection scope of the present application. At the same time, the parameters of each negative electrode film given in the present application also refer to the parameters of a single-sided negative electrode film.

Next, a battery according to the second aspect of the present application will be described, which comprises the negative electrode sheet of the first aspect of the present application.

The battery further comprises a positive electrode sheet, an electrolyte, and an isolation film.

It should be noted that the battery according to the second aspect of the present application may be a lithium-ion battery, a sodium-ion battery, and any other battery using the negative electrode sheet according to the first aspect of the present application.

Specifically, when the battery is a lithium-ion battery: the positive electrode sheet may include a positive current collector and a positive electrode film provided on at least one surface of the positive current collector and comprising a positive active material. The positive active material may be one or more selected from lithium cobalt oxide, lithium nickel oxide, lithium manganese oxide, lithium nickel manganese oxide, lithium nickel cobalt manganese oxide, lithium nickel cobalt aluminum oxide, and olivine-type lithium-containing phosphates, but the present application is not limited to these materials, other conventionally known materials that can be used as the positive active material of the lithium-ion battery can also be used. These positive active materials may be used alone, or two or more of them may be used in combination. Optionally, the positive active material can be one or more selected from $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $Ni_{0.8}Co_{0.1}Mn_{0.1}O_2$ (NCM811), $LiNi_{0.85}Co_{0.15}Al_{0.05}O_2$, $LiFePO_4$ (LFP) and $LiMnPO_4$.

Specifically, when the battery is a sodium-ion battery: the positive electrode sheet may include a positive current collector and a positive electrode film provided on at least one surface of the positive electrode current collector and comprising a positive electrode active material. The positive active material may be selected from transition metal oxide $Na_xMO_2$ (M represents transition metal, optionally, M is one or more selected from Mn, Fe, Ni, Co, V, Cu, Cr, $0<x\leq1$), polyanion-type material (phosphate-type, fluorophosphates-type, pyrophosphate-type, sulfate-type), and prussian blue material, but this application is not limited to these materials, other conventionally known materials that can be used as the positive active material of the sodium-ion battery can also be used. These positive active materials may be used alone, or two or more of them may be used in combination. Optionally, the positive active material may be one or more specifically selected from $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, prussian blue material and a material with the general formula of $A_aM_b(PO_4)_cO_xY_{3-x}$ (A is one or more selected from $H^+$, $Li^+$, $Na^+$, $K^+$, $NH_4^+$; M represents transition metal cation, optionally, M is one or more selected from V, Ti, Mn, Fe, Co, Ni, Cu and Zn; Y represents anion of halogen, optionally, Y is one or more selected from F, Cl and Br; $0\leq a\leq4$, $0<b\leq2$, $1\leq3$, $0\leq x\leq2$).

In the battery of the second aspect of the present application, the isolation film is provided between the positive electrode sheet and the negative electrode sheet and The type of the isolation film is not specifically limited, the isolation film can be any isolation film used in existing batteries, for example, the isolation film may be a polyethylene membrane, a polypropylene membrane, a polyvinylidene fluoride membrane and a multilayer composite membrane thereof, but the present disclosure is not limited thereto.

In the battery of the second aspect of the present application, the electrolyte comprises an electrolyte salt and an organic solvent, the specific type of the electrolyte salt and the organic solvent are not specifically limited, and may be selected based on actual demands. The electrolyte may also comprise an additive, and the type of the additive is not specifically limited. The additive may be a negative electrode film-forming additive; the additive may also be a positive electrode film-forming additive; the additive may also be an additive used for improving one certain performance of the battery, such as an additive used for improving the overcharge performance of the battery, an additive used for improving the high-temperature performance of the battery, an additive used for improving the low-temperature performance of the battery and the like.

In the following, a lithium ion battery is taken as an example and combined with specific embodiments to further illustrate the present application. It should be understood that these embodiments are only used to illustrate the application and not to limit the scope of the application. In the following examples, unless otherwise specified, the raw materials used are all commercially available.

1. The Lithium-Ion Batteries of Examples 1-22 and Comparative Examples 1-4 were Prepared According to the Following Methods (1) Preparation of the Positive Electrode sheet Mixing the positive electrode active material (see Table 1 for details), conductive agent conductive carbon black SP, and the binder polyvinylidene fluoride (PVDF) according to a mass ratio of 95:2:2, adding the solvent N-methylpyrrolidone (NMP), and stirring under the action of a vacuum mixer until the system is homogeneous to obtain a positive slurry; the positive electrode slurry is evenly coated on the two surfaces of the positive current collector aluminum foil, dried at room temperature and transferred to the oven to continue drying, and then cold pressed and slit to obtain the positive electrode sheet.

(2) Preparation of the Negative Electrode sheet

Mixing the negative active material (see table 1 for detail), conductive agent conductive carbon black SP, thickener carboxymethyl cellulose (CMC) and binder styrene butadiene rubber (SBR) according to a certain mass ratio, adding solvent deionized water, mixing under the action of a vacuum mixer until the system was homogeneous to obtain a negative slurry; then the negative slurry was uniformly coated on two surfaces of negative current collector copper foil, dried at room temperature and transferred to the oven to continue drying, and then cold pressed and slit to obtain the negative electrode sheet.

(3) Preparation of the Electrolyte

Mixing ethylene carbonate (EC), ethyl methyl carbonate (EMC) and diethyl carbonate (DEC) according to a volume ratio of 1:1:1 together to obtain an organic solvent, then LiPF6, a well-dried lithium salt, was dissolved into the mixed organic solvent to prepare an electrolyte at a concentration of 1 mol/L.

(4) Preparation of the Isolation film

A polyethylene membrane was selected as the isolation film.

(5) Preparation of the Lithium-ion Battery

Stacking the positive electrode sheet, the isolation film, and the negative electrode sheet in order, the isolation film was positioned between the positive electrode sheet and the negative electrode sheet to play the role of isolation, then winding to form a bare cell; placing the bare cell into an outer packaging shell, and injecting the electrolyte after drying, after vacuum encapsulation, standing, chemical formation, shaping and the like, a lithium-ion battery was obtained.

2. Parametric Measurement of the Negative Electrode Active Material and the Negative Electrode Sheet (1) The volume median particle diameter Dv50 of the negative active material can be obtained by using a laser diffraction particle size distribution measuring apparatus (Mastersizer 3000). Dv50 represents the particle diameter corresponding to the cumulative volume percentage of the negative active material reaching 50%.

(2) The porosity P of the negative electrode film can be obtained by the gas replacement method, the porosity $P=(V_1-V_2)/V_1\times100\%$, $V_1$ represents the apparent volume of the negative electrode film, and $V_2$ represents the real volume of the negative electrode film.

(3) The capacity M per unit area of the negative electrode film can be tested by the following method Taking the negative electrode sheet prepared in each example and comparative example, and use a punching die to obtain a certain area of a single-sided coated negative wafer. Using the metal lithium sheet as the counter electrode and the Celgard membrane as the isolation film, using the electrolyte prepared in the foregoing examples and comparative examples, six CR2430 button cells were assembled in a glove box protected by argon. After assembled, the button cell were left to stand for 12 hours, after which they were tested. Firstly, a constant-current discharge was performed at a discharge current of 0.05 C until the voltage was 5 mV; then a constant-current discharge was performed at a discharge current of 50 μA until the voltage is 5 mV; then a constant-current discharge was performed at a discharge current of 10 μA until the voltage is 5 mV; after standing for 5 minutes, a final constant-current charge was performed at a charging current of 0.05 C until the final voltage was 2V, and record the charging capacity of this step. The average charging capacity of the six button batteries was the average charging capacity of the negative electrode film.

The capacity M per unit area of the negative electrode film=the average charging capacity of the negative electrode film/the area of the negative wafer.

(4) Adhesive Force between the Negative electrode film and the Negative Current Collector The cohesive force between the negative electrode film and the negative current collector test can refer to the national standard GB/T 2790-1995 adhesives 180° peel strength test method. The specific test can be carried out by using a high iron puller to test the 180° peeling force at a peeling speed of 50 mm/min. The average peel strength collected when the negative electrode film with a length of 60 mm is completely peeled from the negative current collector was taken as the cohesive force between the negative electrode film and the negative current collector.

3. Battery Performance Test (1) Test of the Dynamics Performance

At 25° C., the batteries prepared in the examples and comparative examples were fully charged at xC and then fully discharged at 1 C for 10 cycles, then the batteries were fully charged at xC, and then the negative electrode sheets were disassembled and the lithium precipitation on the surface of each negative electrode sheet was observed. If there was no lithium precipitation on the cathode surface, the test process was repeated with a charging rate xC increased in increments of 0.1 C, until the surface of the negative electrode was lithium precipitated and the test process was stopped. At this time, the charging rate x C minus 0.1 C was the maximum charging rate of the battery.

(2) Test of the Actual Energy Density

At 25° C., the batteries prepared in the examples and the comparative examples were fully charged at 1 C rate and fully discharged at 1 C rate, the actual discharge energy was recorded at this time; at 25° C., the batteries were weighed by an electronic balance. And a ratio of the actual discharge capacity of the battery discharged at 1 C to the weight of the battery is the actual energy density of the battery.

When the actual energy density was less than 80% of the targeted energy density, the actual energy density of the battery was considered to be very low; when the actual energy density was more than or equal to 80% of the targeted energy density and less than 95% of the targeted energy density, the actual energy density of the battery was considered to be lower; when the actual energy density was more than or equal to 95% of the targeted energy density and less than 105% of the targeted energy density, the actual energy density of the battery was considered to be moderate; when the actual energy density was more than or equal to 105% of the targeted energy density and less than 120% of the targeted energy density, the actual energy density of the battery was considered to be higher; when the actual energy density was more than 120% of the targeted energy density, the actual energy density of the battery was considered to be very high.

(3) Test of the Cycle Performance

At 25° C., the batteries prepared in the examples and comparative examples were charged at 3 C rate, discharged at 1 C rate, and the fully charging and discharging process was repeated until the capacity of the battery decayed to 80% of the initial capacity, and the cycle number of the battery was recorded.

The test results of each example and comparative example are shown in table 2.

TABLE 1

Parameters of examples 1-22 and comparative examples 1-4

| | Type of positive active material | Negative active material | | | Negative electrode film | | | |
|---|---|---|---|---|---|---|---|---|
| | | | | | | Coating | | |
| | | Type | Dv50 (μm) | Gram volume (mAh/g) | Porosity P | weight per unit area (mg/cm$^2$) | capacity per unit area M (mAh/cm$^2$) | Formula 1 |
| Example 1 | LFP | graphite | 4 | 250 | 20% | 6.3 | 1.58 | 6.0 |
| Example 2 | LFP | graphite | 4 | 320 | 20% | 3.9 | 1.25 | 6.1 |
| Example 3 | LFP | graphite | 4 | 350 | 20% | 3 | 1.05 | 6.2 |
| Example 4 | LFP | graphite | 4 | 365 | 30% | 15.7 | 5.73 | 6.5 |
| Example 5 | LFP | graphite | 12 | 360 | 30% | 8.7 | 3.13 | 6.8 |
| Example 6 | LFP | graphite | 16 | 350 | 30% | 3 | 1.05 | 7.5 |
| Example 7 | LFP | graphite | 4 | 350 | 50% | 16.4 | 5.74 | 10.8 |
| Example 8 | LFP | graphite | 12 | 350 | 50% | 8.9 | 3.12 | 11.4 |
| Example 9 | LFP | graphite | 16 | 350 | 50% | 3 | 1.05 | 12.5 |
| Example 10 | LFP | graphite | 4 | 350 | 60% | 16.4 | 5.74 | 12.9 |

TABLE 1-continued

Parameters of examples 1-22 and comparative examples 1-4

| | Type of positive active material | Negative active material | | | Negative electrode film | | | |
| --- | --- | --- | --- | --- | --- | --- | --- | --- |
| | | | | | Coating | | | |
| | | Type | Dv50 (μm) | Gram volume (mAh/g) | Porosity P | weight per unit area (mg/cm$^2$) | capacity per unit area M (mAh/cm$^2$) | Formula 1 |
| Example 11 | NCM 811 | graphite (314 mAh/g) and silicon monoxide (1000 mAh/g) with a mass ratio of 8:2 | 12 | 520 | 60% | 6 | 3.12 | 13.7 |
| Example 12 | LFP | graphite | 4 | 350 | 60% | 1.5 | 0.53 | 19.2 |
| Example 13 | LFP | graphite | 8 | 350 | 60% | 1.5 | 0.53 | 18 |
| Example 14 | LFP | graphite | 12 | 350 | 25% | 16.4 | 5.74 | 4.4 |
| Example 15 | LFP | graphite | 4 | 350 | 15% | 3 | 1.05 | 4.6 |
| Example 16 | LFP | graphite | 4 | 350 | 70% | 8.7 | 3.05 | 18.8 |
| Example 17 | LFP | graphite | 4 | 350 | 30% | 0.8 | 0.28 | 9.7 |
| Example 18 | LFP | graphite | 4 | 350 | 50% | 22.3 | 7.81 | 8.7 |
| Example 19 | LFP | graphite | 22 | 350 | 50% | 16.4 | 5.74 | 6.3 |
| Example 20 | LFP | graphite | 2 | 350 | 50% | 3 | 1 | 16 |
| Example 21 | LFP | graphite | 12 | 350 | 50% | 8.9 | 3.12 | 11.4 |
| Example 22 | LFP | graphite | 16 | 350 | 50% | 3 | 1.05 | 12.5 |
| Comparative example 1 | LFP | graphite | 18 | 350 | 25% | 15.7 | 5.5 | 3.8 |
| Comparative example 2 | LFP | graphite | 4 | 350 | 65% | 1.5 | 0.53 | 20.8 |
| Comparative example 3 | NCM 811 | graphite (314 mAh/g) and silicon monoxide (1000 mAh/g) with a mass ratio of 8:2 | 12 | 520 | 20% | 12.5 | 6 | 3.4 |
| Comparative example 4 | NCM 811 | graphite (314 mAh/g) and silicon monoxide (1000 mAh/g) with a mass ratio of 8:2 | 4 | 520 | 65% | 2.1 | 1 | 20.2 |

Note:
Formula 1= P × [(30 − Dv50)/2 + 2 × (10 − M)]

TABLE 2

Test results of examples 1-22 and comparative examples 1-4

| | Cohesive force between the negative electrode film and the negative current collector F(N/m) | Whether satisfy M/3 ≤ F ≤ 6M | Maximum charge rate | Actual energy density | Cycle number |
|---|---|---|---|---|---|
| Example 1 | 4 | Yes | 4.0 C | moderate | 3800 |
| Example 2 | 4 | Yes | 4.0 C | moderate | 4000 |
| Example 3 | 4 | Yes | 4.0 C | moderate | 4200 |
| Example 4 | 6 | Yes | 4.0 C | moderate | 3000 |
| Example 5 | 6 | Yes | 4.1 C | moderate | 4000 |
| Example 6 | 5 | Yes | 4.2 C | moderate | 4200 |
| Example 7 | 12 | Yes | 4.4 C | higher | 5500 |
| Example 8 | 12 | Yes | 4.6 C | higher | 5800 |
| Example 9 | 6 | Yes | 5.0 C | moderate | 4300 |
| Example 10 | 10 | Yes | 4.6 C | higher | 4500 |
| Example 11 | 10 | Yes | 4.2 C | moderate | 4200 |
| Example 12 | 2 | Yes | 3.0 C | lower | 2600 |
| Example 13 | 2 | Yes | 3.2 C | lower | 2500 |
| Example 14 | 15 | Yes | 3.0 C | very high | 2600 |
| Example 15 | 3 | Yes | 3.0 C | moderate | 2200 |
| Example 16 | 10 | Yes | 5.0 C | moderate | 2100 |
| Example 17 | 1 | Yes | 5.0 C | lower | 4100 |
| Example 18 | 20 | Yes | 5.0 C | very high | 4600 |
| Example 19 | 1.9 | Yes | 4.2 C | very high | 3500 |
| Example 20 | 2 | Yes | 4.2 C | lower | 3400 |
| Example 21 | 0.8 | No | 3.5 C | moderate | 3600 |
| Example 22 | 8 | No | 3.6 C | lower | 3800 |
| Comparative example 1 | 3 | Yes | 1.4 C | very high | 130 |
| Comparative example 2 | 0.5 | Yes | 2.5 C | very low | 160 |
| Comparative example 3 | 1 | No | 1.5 C | very high | 180 |
| Comparative example 4 | 1 | Yes | 2.5 C | very low | 140 |

From the test results in table 2, it can be seen that the negative electrode sheets in the batteries of examples 1-22 all satisfy $4 \leq P \times [(30-Dv50)/2+2 \times (10-M)] \leq 20$ and the battery had the characteristics of excellent dynamics performance, long cycle life and higher energy density at the same time. This is due to the good matching relationship between the porosity P of the negative electrode film, the capacity M per unit area of the negative electrode film and the volume median particle diameter Dv50 of the negative active material. The liquid phase conduction resistance of lithium ions inside the pore channels of the negative porous electrode, charge exchange between lithium ions and electrons on the surface of the negative active material and the solid phase diffusion and accumulation resistance of lithium ions in the bulk phase of the negative active material were smaller, thereby the battery having the characteristics of excellent dynamics performance, long cycle life and higher energy density at the same time.

Compared with examples 1-22, in comparative examples 1-4, the porosity P of the negative electrode film, the capacity M per unit area of the negative electrode film and the volume median particle diameter Dv50 of the negative active material were not matched reasonably, resulting in that $P \times [(30-Dv50)/2+2 \times (10-M)]$ did not fall within the given range, therefore the battery could not have excellent dynamics performance, long cycle life and high energy density at the same time.

The porosity P of the negative electrode sheet is optionally controlled in the range of 20% to 65%, and within the above preferable range, the battery can have both the excellent dynamics and long cycle life. The capacity M per unit area of the negative electrode film is optionally controlled between 0.5 mAh/cm$^2$ and 7.0 mAh/cm$^2$, and within the above preferred range, the battery can have both the long cycle life and high energy density. The volume median particle diameter Dv50 of the negative active material is optionally controlled in the range of 4 μm~20 μm, and within the above preferred range, the battery can have both the excellent dynamics performance and high energy density.

However, when one or more of the parameters of the porosity P of the negative electrode film, the capacity M per unit area of the negative electrode film, and the volume median particle diameter Dv50 of the negative active material do not meet the above preferred range, as long as it is ensured that $4 \leq P \times [(30-Dv50)/2+2 \times (10-M)] \leq 20$, combined with Examples 15-20, the battery can still have good dynamics performance and cycling performance without sacrificing energy density.

From example 11 and comparative examples 3-4, when the battery uses different positive and negative active materials, as long as the negative electrode sheet satisfies $4 \leq P \times [(30-Dv50)/2+2 \times (10-M)] \leq 20$, the battery can still have the characteristics of excellent dynamics performance, long cycle life and higher energy density at the same time.

Further, when adjust the relationship between the adhesive force F between the negative electrode film and the negative current collector as well as the capacity M per unit area of the negative electrode film to satisfy $M/3 \leq F \leq 6M$, it can better improve dynamics performance and cycle performance of the battery, while ensuring that the battery has the advantage of higher energy density.

In combination with example 21, the adhesive force F between the negative electrode film and the negative electrode current collector is smaller, the electronic contact between the negative active material particles is worse, the electronic contact between the negative electrode film and the negative current collector is worse, the conductivity of electrons through the negative current collector to the negative current collector is worse, and the charge exchange resistance between lithium ions and electrons on the surface of the negative active material is larger. Therefore, compared with example 8, the improvement of dynamics performance and cycle performance of the battery is slightly worse in example 21. In combination with example 22, the adhesive force F between the negative electrode film and the negative current collector is too large. During this process, the negative electrode film is added with a large amount of binder with poor conductivity, the energy density of the battery may be reduced, and the conductivity of the electrons through the negative current collector to the negative electrode film is worse, and the charge exchange resistance of lithium ions and electrons on the surface of the negative active material is larger. Therefore, compared with example 9, the improvement of dynamics performance and cycle performance of the battery is also slightly worse in example 22.

According to the foregoing disclosure and teachings of the present specification, a person skilled in the art can also make variations and modifications to the above implementing manners. Therefore, the present application is not limited to the specific implementing manners disclosed and described above, modifications and variations of the present application should also fall within the protection scope of the claims of the present application. Furthermore, although specific terminologies are used in the present specification, these terminologies are merely for convenience of description, and are not intended to limit the present application.

The invention claimed is:

1. A battery, comprising a negative electrode sheet, wherein the negative electrode sheet comprises:
a negative current collector and a negative electrode film comprising an active negative material, comprising particles, provided on at least one surface of the negative current collector;
wherein the negative electrode film satisfies: $4 \leq P \times [(30-Dv50)/2 + 2 \times (10-M)] \leq 16$;
wherein P represents a porosity of the negative electrode film, and the porosity P of the negative electrode film is 20%-25%; Dv50 represents a volume median particle diameter of the negative active material, a unit is µm, and the volume median particle diameter Dv50 of the negative active material is 4 µm-20 µm; and M represents a capacity per unit area of the negative electrode film, a unit is $mAh/cm^2$, and the capacity M per unit area of the negative electrode film is 3.05 $mAh/cm^2$-7.0 $mAh/cm^2$.

2. The battery according to claim 1, wherein the negative electrode film satisfies: $6 \leq P \times [(30-Dv50)/2 + 2 \times (10-M)] \leq 15$.

3. The battery according to claim 1, wherein the volume median particle diameter Dv50 of the negative active material is 4 µm-16 µm.

4. The battery according to claim 1, wherein the capacity M per unit area of the negative electrode film is 3.05 $mAh/cm^2$-5.5 $mAh/cm^2$.

5. The battery according to claim 1, wherein a coating weight per unit area of the negative electrode sheet is 1 $mg/cm^2$-22 $mg/cm^2$, wherein the coating weight per unit area is a weight of a mixture coated on the negative current collector per unit area.

6. The battery according to claim 1, wherein compaction density PD of the negative electrode film is 0.8 $g/cm^3$-2.0 $g/cm^3$.

7. The battery according to claim 1, wherein: the negative active material is selected from the group consisting of carbon material, silicon-based material, tin-based material and lithium titanate.

8. The battery according to claim 1, wherein: the negative active material is selected from the group consisting of carbon material and silicon-based material.

* * * * *